Sept. 17, 1929. S. E. ANDERSON 1,728,521
CAKE SAFE
Filed Oct. 12, 1927
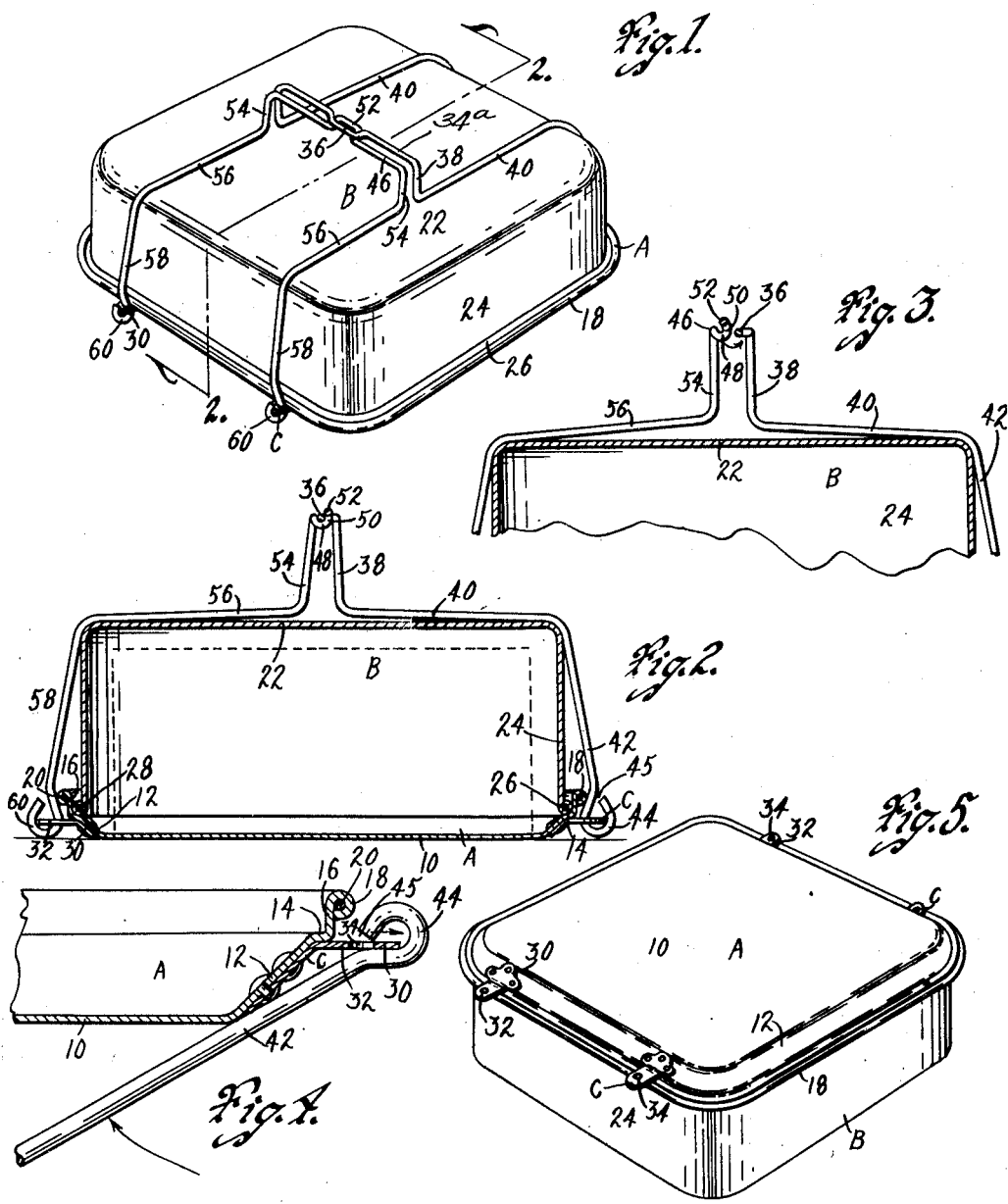

Patented Sept. 17, 1929

1,728,521

UNITED STATES PATENT OFFICE

SIGURD E. ANDERSON, OF DES MOINES, IOWA, ASSIGNOR TO GRACE C. ROWELL, OF LEON, IOWA

CAKE SAFE

Application filed October 12, 1927. Serial No. 225,700.

The object of the present invention is to provide a cake safe in the form of a container for the convenient storage, carrying and preserving of cakes and other articles.

More particularly, it is my object to provide a cake safe having a bottom member upon which a cake may be placed, and to provide an inverted cover to receive the cake and rest upon and snugly fit the bottom member.

It is my purpose in this connection to provide a bottom member having an inclined peripheral wall for holding the cake centered and slightly spaced from the side walls of the safe.

Another object of my invention is to provide a novel handle structure, whereby handles may be detachably connected with the bottom member and engage each other over the top of the cover for a readily detachable connection.

With these and other objects in view, my invention consists in the construction, arrangement and combination of the various parts of my cake safe, whereby the objects contemplated are attained, as hereinafter more fully set forth, pointed out in my claim, and illustrated in the accompanying drawings, in which:

Figure 1 is a perspective view of a cake safe embodying my invention.

Figure 2 is a detail, vertical, sectional view taken on the line 2—2 of Figure 1.

Figure 3 is a detail, sectional view of part of the cover member and parts of the handles, illustrating the position of the upper parts of the handles just before they are connected together.

Figure 4 is a detail, sectional view of a portion of the bottom of the cake safe illustrating the manner of connecting the handles therewith; and Figure 5 is a perspective view of the cake safe in inverted position.

In the accompanying drawings, I have used the reference character A to indicate generally the bottom member of my cake safe and the reference character B to represent the top member thereof.

The bottom member A comprises a flat sheet 10, which is preferably made of sheet metal, having some resiliency, such for instance as aluminum, but may be made of any material suitable for its purpose.

The bottom member A has at its edges a peripheral, upwardly and outwardly inclined flange 12.

The cake safe is preferably rectangular in outline with rounded corners, but may be made in different shapes.

The flange 12 is continuous and forms a short side wall for the bottom member. The inclined flange 12 terminates in a short, outwardly extending horizontal flange or shelf 14 at the outer edge of which is formed a peripheral, vertical, upwardly extending flange 16.

The metal at the upper edge of the flange 16 is curled to form a substantially cylindrical portion 18 receiving a relatively stiff wire 20.

The top or cover member B has the form of an inverted pan with a flat top element 22, having at its edges a peripheral, relatively long, downwardly extending flange 24, the lower edge of which is curled to form a cylinder or cylinders 26, receiving the relatively stiff wire 28.

The parts are so arranged that the curled portion 26 of the top or cover member B can be snugly shoved just inside the flange 16 and resiliently gripped thereby for making a snug joint, whereby the parts are frictionally held together.

I provide a pair of handles, which are detachably connected with the bottom member A. At the opposite sides of the bottom member A, I provide spaced ears C. Each ear C has a flat plate portion 30 riveted or otherwise secured to the outer face of the flange 12, and having at its upper edge a horizontal, laterally extending flat, thin flange 32 formed with a hole 34.

There are two of the ears C on one side and two on the opposite side of the bottom member A.

I will now describe the handles of my improved cake safe, and for convenience will describe them one at a time.

Each handle is comprised of a single, resilient wire.

One handle has a central member, which when in use is spaced above the member 22 of the top B and is indicated at 34ᵃ in Figure 1. It extends across the cake safe above it for a convenient length, as for example five inches, and has at its central part a short offset portion 36, offset in the direction away from the side of the safe from which that handle is positioned.

At the ends of the portion 34ᵃ of the handle now being described are portions extending downwardly toward the cover member B as at 38. These portions, which are upright when the handle is in position for use, are parallel with each other and have at their lower ends portions 40, extending away from the portions 38 in parallel relation with each other toward one side of the cake safe, as shown in Figure 1.

At the outer ends of the portions 40 are downwardly inclined portions 42, terminating in eyes 44, the ends of which are open as at 45, sufficiently to permit the handle to be swung downwardly, so that it hangs below the cake safe, when the eye portions 44 can be inserted in the holes 34 of the ears C.

The handles are thus made conveniently removable and the flanges 30 are thin and flat for accomplishing this purpose.

The ears C are of steel or any material stiff enough for the purpose.

The other handle has a central part, which when the handles are in use, stands above the cake safe and extends generally parallel with the portion 34 and is indicated at 46. The handle portion 46 has at its central part short portions 48 projecting away from the main part of the portion 46 at right angles in a direction away from the side of the cake safe to which the handle under description is pivoted and terminating in short upwardly projecting portions 50, which are connected by a horizontal portion 52. The portion 52 is a little shorter than the offset portion 36.

Extending downwardly from the end of the portion 46 are parallel parts 54. At the lower ends of the parts 54 are parallel parts 56 inclined laterally and downwardly to the side of the cake safe and having at their outer ends downwardly inclined portions 58 terminating in eyes 60 similar to the eyes 44 and similarly connected with the appropriate ears C.

It will be observed that the handle now being described is made of a single piece of resilient wire and the parts are so bent in the course of manufacture that the portions 56 incline from their outer ends upwardly and inwardly, as shown in Figure 3, so that the resiliency of the material holds the member 52 a little above the level of the member 34ᵃ, when the handles are swung over the cake safe, as shown in Figure 3. The member 34ᵃ can then be sprung over and beyond the member 52 to the position shown in Figure 1, whereby the handles are locked together and the portions 34ᵃ and 52 form a gripping handle, by which the cake safe may be carried.

A cake safe as above described has a number of important features of structure, whereby it is given certain specific advantages.

The inclined flange 12 forming a short wall for the bottom A serves to keep the cake or other content of the safe centered and slightly spaced from the wall member 24, so that for instance where a cake covered with icing is placed in the safe, the icing will not come into contact with the side walls 24 and be injured or defaced.

The flange 14 offers a support for the cover member and the flange 16 forms a means for gripping the lower edge of the cover member, so that the cover member will be frictionally held on the bottom even when the handles are not employed.

The handles may be quickly and easily detached, if this is desirable. The detachability of the handles is important, because it permits the cake safe to be inverted and used as a container for food products or otherwise, as shown in Figure 5. When in that position, the member A forms the top or cover, and the member B forms the bottom of the cake safe. The member A will be snugly gripped on the member B.

Returning, however, to the consideration of the safe when in its normal position, it will be noted that the handles can be swung from the position shown in Figure 4 upwardly and over the cover member to their position shown in Figure 3. They may then be sprung together in the manner already mentioned for locking them and forming a convenient means for carrying the cake safe and its contents.

Such a cake safe can be used for conveniently transporting a cake from place to place and for preserving it against injury during such transportation.

A cake can be kept in such a safe and on account of the snug fit between the top and the bottom will be preserved against rapid drying out.

It will be understood that the parts of my improved cake safe may be made of any material suitable for the purpose, such for instance as aluminum or other sheet metal, pulp, paper, etc., and that the shape of the safe may be varied, and it is my intention to cover by my claim any modified forms of structure or use of mechanical equivalents in the structure of the safe, which may be reasonably included within the scope of such claim.

I claim as my invention:

In a cake safe, an inverted substantially deep top member, a relatively shallow bottom having a peripheral upwardly and outwardly extending flange, a horizontal portion at the outer edge thereof on which the top rests, and an upwardly extending member at the outer edge of the horizontal portion, ears secured to the inclined flange on opposite sides of the bottom having portions projecting laterally therefrom having holes, and a pair of resilient handles having central parts adapted to be interlocked above the cake safe, and each having spaced members extending downwardly from the central parts, thence laterally, thence downwardly and terminating in open loops or eyes capable of being detachably extended through the holes in the ears Des Moines, Iowa, July 12, 1927.

SIGURD E. ANDERSON.